United States Patent
Jain

(10) Patent No.: US 12,471,045 B2
(45) Date of Patent: Nov. 11, 2025

(54) SELECTION OF NETWORK EQUIPMENT BASED ON DELAY FOR DELAY CRITICAL SERVICES

(71) Applicant: Dell Products L.P., Round Rock, TX (US)

(72) Inventor: Hemant Kumar Bhawarlal Jain, Bangalore (IN)

(73) Assignee: DELL PRODUCTS, L.P., Round Rock, TX (US)

( * ) Notice: Subject to any disclaimer, the term of this patent is extended or adjusted under 35 U.S.C. 154(b) by 402 days.

(21) Appl. No.: 18/329,042

(22) Filed: Jun. 5, 2023

(65) Prior Publication Data

US 2024/0406895 A1    Dec. 5, 2024

(51) Int. Cl.
*H04W 56/00* (2009.01)
*H04W 92/24* (2009.01)

(52) U.S. Cl.
CPC ........ *H04W 56/0015* (2013.01); *H04W 92/24* (2013.01)

(58) Field of Classification Search
CPC .................. H04W 56/00015; H04W 92/24
See application file for complete search history.

(56) References Cited

U.S. PATENT DOCUMENTS

2021/0243652 A1*  8/2021  Yao ..................... H04W 48/18

FOREIGN PATENT DOCUMENTS

| EP | 4135388 A1 * | 2/2023 | ............ H04W 24/08 |
| WO | WO-2021028040 A1 * | 2/2021 | ......... H04L 43/0858 |
| WO | WO-2022052129 A1 * | 3/2022 | ............ H04W 24/08 |

OTHER PUBLICATIONS

ESTI "5G; System architecture for the 5G System (5GS) (3GPP TS 23.501 version 17.8.0 Release 17)" ETSI, Apr. 2023, 575 pages.
ESTI "5G; Management and orchestration; 5G performance measurements (3GPP TS 28.552 version 15.0.0 Release 15)" ESTI, Oct. 2018, 41 pages.
International Search Report and Written Opinion received for PCT Application Serial No. PCT/US2023/036187 dated Apr. 19, 2024, 16 pages.

* cited by examiner

*Primary Examiner* — Joseph A Bednash
(74) *Attorney, Agent, or Firm* — Amin, Turocy & Watson, LLP

(57) ABSTRACT

Selection of network equipment based on delay for delay critical services (e.g., using a computerized tool), is enabled. For example, a system can comprise: a processor and a memory that stores executable instructions that, when executed by the processor, facilitate performance of operations, comprising: determining, for respective distributed units of a group of distributed units of network equipment, respective average downlink delays on an F1-U interface applicable to respective centralized unit user planes of a group of centralized unit user planes of the network equipment, and transmitting, to a centralized unit control plane of the network equipment, delay data representative of the respective average downlink delays.

20 Claims, 10 Drawing Sheets

| IE/Group Name | Presence | Range | IE Type and Reference | Semantics Description | Criticality | Assigned Criticality |
|---|---|---|---|---|---|---|
| Report Characteristics | C-ifRegistrationRequestStart | | BITSTRING (SIZE(32)) | Each position in the bitmap indicates measurement object the gNB-CU-UP is requested to report. First Bit = TNL Avaialble Capacity Ind Periodic, Second Bit = HW Capacity Ind Periodic. Third Bit = DL F1-U Delay Ind Periodic. Other bits shall be ignored by the gNB-CU-UP | YES | Reject |
| gNB-DU-id-list | C-ifRegistrationRequestStartDLF1UDelay | 1..<maxNumOfgNBDU> | | | | |
| > gNB-DU ID | | | 9.3.1.65 | | | |

| Range Bound | Explanation |
|---|---|
| *maxNumOfgNBDU* | Maximum no. of gNB-DU connected to gNB-CU-UP. Value is 512 |

| Condition | Explanation |
|---|---|
| *C-ifRegistrationRequestStartDLF1UDelay* | The IE shall be present if the *Registration Request* IE is set to the value "start" AND Third bit in Report Characteristic is set |

FIG. 3

| IE/Group Name | Presence | Range | IE Type and Reference | Semantics Description | Criticality | Assigned Criticality |
|---|---|---|---|---|---|---|
| Message Type | M | | 9.3.1.1 | | YES | Ignore |
| Tranaction ID | M | | 9.3.1.53 | | YES | Reject |
| gNB-CU-CP Measurement ID | M | | INTEGER (1..4095,...) | Allocated by gNB-CU-CP | YES | Reject |
| gNB-CU-UP Measurement ID | M | | INTEGER (1..4095,...) | Allocated by gNB-CU-UP | YES | Reject |
| TNL Available Capacity Indicator | O | | 9.3.1.72 | | | |
| HW Capacity Indicator | O | | 9.3.1.73 | | | |
| DL-F1-U Delay Ind Periodic | O | | 9.3.1.XX | | | |

| IE/Group Name | Presence | Range | IE Type and Reference | Semantics Description |
|---|---|---|---|---|
| gNB-DU-id-list | M | 1..<maxNumOfgNBDU> | | |
| > gNB-DU ID | M | | 9.3.1.65 | |
| > Average DL F1-U Delay | M | | INTEGER (0..1000,...) | Average DL F1-U delay is ms measured at the gNB-CU-CP |

FIG. 4

SELECTION OF NETWORK EQUIPMENT BASED ON DELAY FOR DELAY CRITICAL SERVICES

BACKGROUND

With each new generation of cellular networks, mobile connectivity becomes increasingly ubiquitous. More and more devices are becoming internet connected, and cellular network bandwidths continue to increase to accommodate the increased demand. However, network constraints still exist, and in some locations, or at certain times, cellular networks can still become overloaded, leading to poor performance for connected devices.

Wireless technologies deliver a variety of services (e.g., ultra broadband, low latency, massive capacity, etc.) To differentiate these services, end to end, fifth generation (5G) defines Quality of Service (QOS) parameters. For low latency/delay critical service, the packet delay budget (PDB) is defined as part of a QoS profile. When a delay applicable to a packet exceeds a PDB, the packet may be discarded, which can lead to a failure to satisfy a corresponding QoS requirement. In a 5G radio access network (RAN), the main contributors to delay are delay in gNodeB control unit user plane (gNB-CU-UP), delay between gNB-CU-UP and a distributed unit (DU), and delay between DU and a user equipment (UE). Conventionally, the delay between the gNB-CU-UP and the DU is based on an operator configuration, which is static. One issue with the static delay configuration is that, in case of a cloud deployment, there can be n DU's connected to m gNB-CU-UP's. With such configuration (e.g., high value of n and m), measuring the delay and updating the same via operator configuration manually is tedious and error prone. Each time the deployment changes, measurements and updates must be reconfigured. In cases when congestion occurs in the transport, the real delay will start to deviate from the configured value.

The above-described background relating to telecommunications is merely intended to provide a contextual overview of some current issues and is not intended to be exhaustive. Other contextual information may become further apparent upon review of the following detailed description.

BRIEF DESCRIPTION OF DRAWINGS

FIG. 3 illustrates an exemplary an E1 application protocol (E1AP) resource status request message in accordance with one or more embodiments described herein.

FIG. 4 illustrates an exemplary an E1AP resource status update message in accordance with one or more embodiments described herein.

DETAILED DESCRIPTION

Figure 1:
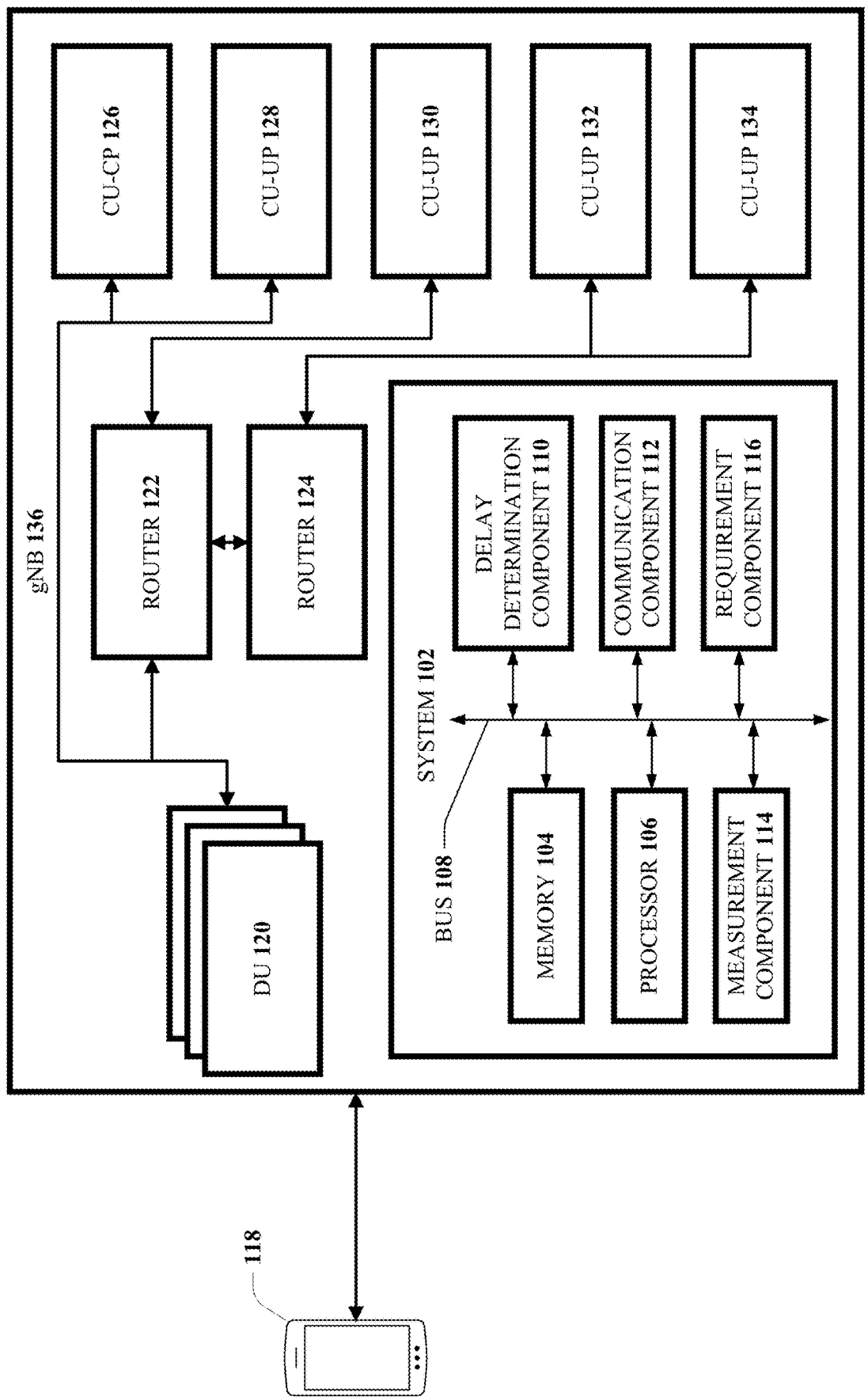
FIG. 1 is a block diagram of an exemplary system in accordance with one or more embodiments described herein.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As alluded to above, selection of network equipment can be improved in various ways, and various embodiments are described herein to this end and/or other ends. The disclosed subject matter relates to telecommunications and, more particularly, to selection of network equipment based on delay for delay critical services. Embodiments herein can facilitate, for instance, measuring CU-UP and DU delay dynamically, without any manual intervention and providing the same periodically to a control unit control plane (CU-CP).

According to an embodiment, a system can comprise a processor, and a memory that stores executable instructions that, when executed by the processor, facilitate performance of operations, comprising determining, for respective distributed units of a group of distributed units of network equipment, respective average downlink delays on an F1-U interface applicable to respective centralized unit user planes of a group of centralized unit user planes of the network equipment, and transmitting, to a centralized unit control plane of the network equipment, delay data representative of the respective average downlink delays.

In one or more embodiments, the operations can further comprise receiving, from the centralized unit control plane, respective identifiers applicable to the respective distributed units, wherein the determining of the respective average downlink delays comprises determining the respective average downlink delays per identifier of the respective identifiers.

In various embodiments, the transmitting of the delay data representative of the respective average downlink can comprise transmitting according to a defined user equipment specific message applicable to the group of centralized unit user planes.

In some embodiments, a respective average downlink delay for a distributed unit of the group of distributed units can be determined by aggregating respective average downlink delays on F1-U samples for any user equipment associated with the distributed unit.

In one or more embodiments, the centralized unit control plane can utilize the respective average downlink delays on the F1-U interface to select a centralized unit user plane of the group of centralized unit user planes to communicatively couple to a user equipment for delay critical services.

In various embodiments, the determining of the respective average downlink delays can comprise determining the respective average downlink delays per public land mobile network applicable to the group of centralized unit user planes. In further embodiments, the determining of the respective average downlink delays can comprise determining the respective average downlink delays per quality of service level applicable to the group of centralized unit user planes. In additional embodiments, the determining of the respective average downlink delays can comprise determining the respective average downlink delays per single network slice selection assistance information applicable to the group of centralized unit user planes.

In another embodiment, a non-transitory machine-readable medium can comprise executable instructions that, when executed by a processor, facilitate performance of operations, comprising obtaining, from a group of centralized unit user planes of network equipment, for each distributed unit of a group of distributed units of the network equipment, respective average downlink delays experienced via an F1-U interface applicable to the group of centralized unit user planes, and determining a centralized unit user plane of the group of centralized unit user planes to communicatively couple to a user equipment for delay intolerant services.

In various embodiments, the respective average downlink delays can be periodically reported by the group of centralized unit user planes using a defined E1 application protocol status procedure.

In one or more embodiments, the operations can further comprise initiating measurements of the respective average downlink delays experienced via the F1-U interface applicable to the group of centralized unit user planes.

In some embodiments, the operations can further comprise determining a latency requirement applicable to the user equipment, and in response to a determination that a first centralized unit user plane of the group of centralized unit user planes fails to satisfy a defined delay threshold applicable to the latency requirement, transferring the user equipment from the first centralized unit user plane to a second centralized unit user plane of the group of centralized unit user planes determined to satisfy the defined delay threshold.

In various embodiments, a respective average downlink delay for a distributed unit of the group of distributed units can be determined by aggregating respective average downlink delays experienced via F1-U samples for all user equipment associated with the distributed unit.

In some embodiments, the respective average downlink delays can be determined per public land mobile network applicable to the group of centralized unit user planes. In further embodiments, the respective average downlink delays can be determined per quality of service level applicable to the group of centralized unit user planes. In additional embodiments, the respective average downlink delays can be determined per single network slice selection assistance information applicable to the group of centralized unit user planes.

According to yet another embodiment, a method can comprise determining, by a centralized unit user plane comprising a processor, for respective distributed units of a group of distributed units of network equipment, respective average downlink delays on an F1-U interface applicable to respective centralized unit user planes of a group of centralized unit user planes comprising the centralized unit user plane, and transmitting, by the centralized unit user plane, to a centralized unit control plane of the network equipment, the respective average downlink delays on the F1-U interface.

In various embodiments, the method can further comprise receiving, by the centralized unit user plane from the centralized unit control plane, respective identifiers applicable to the group of distributed units of the network equipment, wherein the respective average downlink delays on the F1-U interface applicable to the group of centralized unit user planes are determined per identifier of the respective identifiers.

In one or more embodiments, the respective average downlink delays on the F1-U interface can be transmitted to the centralized unit control plane according to a defined user equipment specific message applicable to the centralized unit user plane.

In various embodiments, the centralized unit control plane can utilize the respective average downlink delays on the F1-U interface to select the centralized unit user plane of the group of centralized unit user planes to communicatively couple to a user equipment for services identified as delay critical.

It should be appreciated that additional manifestations, configurations, implementations, protocols, etc. can be utilized in connection with the following components described herein or different/additional components as would be appreciated by one skilled in the art.

Turning now to FIG. 1, there is illustrated an example, non-limiting system 102 in accordance with one or more embodiments herein. System 102 can comprise a computerized tool, which can be configured to perform various operations relating to selection of network equipment based on delay for delay critical services. The system 102 can comprise one or more of a variety of components, such as memory 104, processor 106, bus 108, delay determination component 110, communication component 112, measurement component 114, and/or requirement component 116. In various embodiments, a gNodeB (gNB) 136 can comprise the system 102. The gNB 136 can additionally, or alternatively, comprise gNB-DU (distributed unit) 120 (e.g., DU 120), a router 122, a router 124, gNB-CU-CP 126 (e.g., CU-CP 126), gNB-CU-UP 128 (e.g., CU-UP 128), gNB-CU-UP 130 (e.g., CU-UP 130), gNB-CU-UP 132 (e.g., CU-UP 132), and/or gNB-CU-UP 134 (e.g., CU-UP 134). In some embodiments, one or more of the DU 120, router 122, router 124, CU-CP 126, CU-UP 128, CU-UP 130, CU-UP 132, and/or CU-UP 134 can be located externally to the gNB 136. In various embodiments, the gNB 136 can be communicatively coupled to, or can further comprise, mobile device 118 (e.g., a UE). In various embodiments, one or more of the memory 104, processor 106, bus 108, delay determination component 110, communication component 112, measurement component 114, requirement component 116, UE 118, DU 120, router 122, router 124, CU-CP 126, CU-UP 128, CU-UP 130, CU-UP 132, and/or CU-UP 134 can be communicatively or operably coupled (e.g., over a bus or wireless network) to one another to perform one or more functions of the system 102.

According to an embodiment, the delay determination component 110 can determine, for respective distributed units (e.g., one or more of DU 120) of a group of distributed units of network equipment (e.g., gNB 136), respective average downlink delays on an F1-U interface applicable to respective centralized unit user planes (e.g., one or more of CU-UP 128, CU-UP 130, CU-UP 132, and/or CU-UP 132) of a group of centralized unit user planes of the network equipment. Such delays can be determined, for instance, according to a comparison of packet timestamps or other suitable measurements. It is noted that though only one DU 120 is depicted in FIG. 1. DU 120 can be representative and/or comprise a plurality of DU's associated with the gNB 136. In various embodiments herein, network equipment (e.g., gNB 136) can be associated with and/or communicatively coupled to a wireless radio access network. In various embodiments, a respective average downlink delay for a distributed unit (e.g., DU 120) of the group of distributed units can be determined by aggregating (e.g., via the delay determination component 110) respective average downlink delays (e.g., delay measurements or determinations) on F1-U samples for any user equipment (e.g., UE 118) associated with the distributed unit (e.g., DU 120). In some embodiments, the determining (e.g., via the delay determination component 110) of the respective average downlink delays can comprise determining the respective average downlink delays per public land mobile network (PLMN) applicable to the group of centralized unit user planes (e.g., one or more of CU-UP 128, CU-UP 130, CU-UP 132, and/or CU-UP 132). In further embodiments, the determining of the respective average downlink delays can comprise determining the respective average downlink delays per quality of service (QOS) level applicable to the group of centralized unit user planes (e.g., one or more of CU-UP 128, CU-UP 130, CU-UP 132, and/or CU-UP 132). In additional embodiments, the determining of the respective average downlink delays can comprise determining the respective average downlink delays per single network slice selection assistance information (S-NSSAI) applicable to the group of centralized unit user planes (e.g., one or more of CU-UP 128, CU-UP 130, CU-UP 132, and/or CU-UP 132).

According to an embodiment, the communication component 112 can transmit, to a centralized unit control plane (e.g., CU-CP 126) of the network equipment (e.g., gNB 136), delay data representative of the respective average downlink delays. In various embodiments, the transmitting (e.g., via the communication component 112) of the delay data representative of the respective average downlink can comprise transmitting (e.g., via the communication component 112) according to a defined UE specific message applicable to the group of centralized unit user planes. It is noted that, in various embodiments, the centralized unit control plane (e.g., CU-CP 126) can utilize the respective average downlink delays on the F1-U interface to select a centralized unit user plane (e.g., one or more of CU-UP 128, CU-UP 130, CU-UP 132, and/or CU-UP 132) of the group of centralized unit user planes to communicatively couple to a user equipment (e.g., UE 118) for delay critical services. Such a determination of the CU-UP can be according to a defined selection algorithm that minimizes delay for packets applicable to the UE 118 (and/or other UE) for delay critical services. In this regard, a defined CU-UP selection algorithm can comprise the following:
1) Find the list of CU-UP(s) available for the UE.
2) From the list found in Step 1)
   Find the list of CU-UP(s) having enough resources available to meet the QoS requirement for the delay critical service.
3) From the list found in Step 2).
   Select the CU-UP having the lowest value of F1-U delay for the DU to which UE is connected.

According to an embodiment, the communication component 112 can receive, from the centralized unit control plane (e.g., CU-CP 126), respective identifiers applicable to the respective distributed units (e.g., DU 120). In this regard, the determining of the respective average downlink delays can comprise determining the respective average downlink delays per identifier of the respective identifiers. It is noted that the communication component 112 can comprise the hardware required to implement a variety of communication protocols (e.g., infrared ("IR"), shortwave transmission, near-field communication ("NFC"), Bluetooth, Wi-Fi, long-term evolution ("LTE"), 3G, 4G, 5G, 6G, global system for mobile communications ("GSM"), code-division multiple access ("CDMA"), satellite, visual cues, radio waves, etc.)

In another embodiment, the delay determination component 110 can obtain, from a group of centralized unit user planes (e.g., one or more of CU-UP 128, CU-UP 130, CU-UP 132, and/or CU-UP 132) of network equipment (e.g., gNB 136), for each distributed unit (e.g., DU 120) of a group of distributed units of the network equipment, respective average downlink delays experienced via an F1-U interface applicable to the group of centralized unit user planes. In an embodiment, the communication component 112 can then determine (e.g., according to a defined selection algorithm or protocol) a centralized unit user plane of the group of centralized unit user planes to communicatively couple to a user equipment (e.g., UE 118) for delay intolerant services. It is noted that the respective average downlink delays can be periodically reported by the group of centralized unit user planes (e.g., one or more of CU-UP 128, CU-UP 130, CU-UP 132, and/or CU-UP 132) using a defined E1 application protocol (E1AP) status procedure. In various embodiments, the measurement component 114 can initiate measurements of the respective average downlink delays experienced via the F1-U interface, applicable to the group of centralized unit user planes.

In various embodiments, the requirement component 116 can determine a latency requirement applicable to the user equipment (e.g., UE 118). Such a latency requirement can be predefined (e.g., for the UE) or can be determined according to a defined network setting. In this regard, the communication component 112 can, in response to a determination that a first centralized unit user plane (e.g., CU-UP 128 or another CU-UP herein) of the group of centralized unit user planes fails to satisfy a defined delay threshold applicable to the latency requirement, transfer the user equipment from the first centralized unit user plane (e.g., CU-UP 128) to a second centralized unit user plane (e.g., CU-UP 130 or another CU-UP herein) of the group of centralized unit user planes determined to satisfy the defined delay threshold.

In one or more embodiments, a respective average downlink delay for a distributed unit (e.g., DU 120) of the group of distributed units can be determined by aggregating (e.g., via the delay determination component 110) respective average downlink delays experienced via F1-U samples for all user equipment (e.g., UE 118 and/or other suitable UE) associated with the distributed unit (e.g., DU 120). In some embodiments, the determining (e.g., via the delay determination component 110) of the respective average downlink delays can comprise determining the respective average downlink delays per PLMN applicable to the group of centralized unit user planes. In further embodiments, the determining of the respective average downlink delays can comprise determining the respective average downlink delays per QoS level applicable to the group of centralized unit user planes. In additional embodiments, the determining of the respective average downlink delays can comprise determining the respective average downlink delays per single network slice selection assistance information applicable to the group of centralized unit user planes.

According to another embodiment, the delay determination component 110 can determine, for respective distributed units (e.g., DU 120) of a group of distributed units of network equipment, respective average downlink delays on an F1-U interface applicable to respective centralized unit user planes (e.g., one or more of CU-UP 128, CU-UP 130, CU-UP 132, and/or CU-UP 132) of a group of centralized unit user planes comprising the centralized unit user plane (e.g., one or more of CU-UP 128, CU-UP 130, CU-UP 132, and/or CU-UP 132). In this regard, the communication component 112 can transmit, to a centralized unit control plane of the network equipment, the respective average downlink delays on the F1-U interface. In various embodiments, the communication component 112 can further receive, from the centralized unit control plane (e.g., one or more of CU-UP 128, CU-UP 130, CU-UP 132, and/or CU-UP 132), respective identifiers applicable to the group of distributed units of the network equipment. In this regard, the respective average downlink delays on the F1-U interface applicable to the group of centralized unit user planes can be determined (e.g., via the delay determination component 110) per identifier of the respective identifiers.

In some embodiments, the respective average downlink delays on the F1-U interface can be transmitted (e.g., via the communication component 112) to the centralized unit control plane (e.g., CU-CP 126) according to a defined user equipment specific message applicable to the centralized unit user plane. In one or more embodiments, the centralized unit control plane (e.g., CU-CP 126) can utilize the respective average downlink delays on the F1-U interface to select the centralized unit user plane (e.g., one or more of CU-UP 128, CU-UP 130, CU-UP 132, and/or CU-UP 132) of the group of centralized unit user planes to communicatively couple to a user equipment (e.g., UE 118) for services identified as delay critical.

In an example, CU-UP 132 and CU-UP 134 can be placed in a data center. The delay between these CU-UP's (e.g., CU-UP 132 and CU-UP 134) and the DU 120 can be greater than 10 ms, for instance, due to the distance and/or series of components (e.g., routers) between such CU-UP's and the DU 120. In an example, CU-UP 130 can be placed in the near edge cloud. In this regard, the delay between CU-UP 130 and the DU 120 can be fewer than 10 ms. In an example, the CU-UP 128 can be collocated with DU 120. In this regard, the delay between CU-UP 128 and the DU can be fewer than 1 ms. When a new packet data unit (PDU) session is being setup, CU-CP 126 select the CU-UP (e.g., one or more of CU-UP 128, CU-UP 130, CU-UP 132, and/or CU-UP 132) on which the new PDU session would be setup. A defined CU-UP selection algorithm (e.g., applicable to the gNB 136 and/or CU-CP 126) can consider (1) availability of CU-UP resource, (2) QoS parameter for the QoS Flow associated with PDU session, and/or (3) the delay between CU-UP and DU for low latency/delay critical services.

Figure 2:
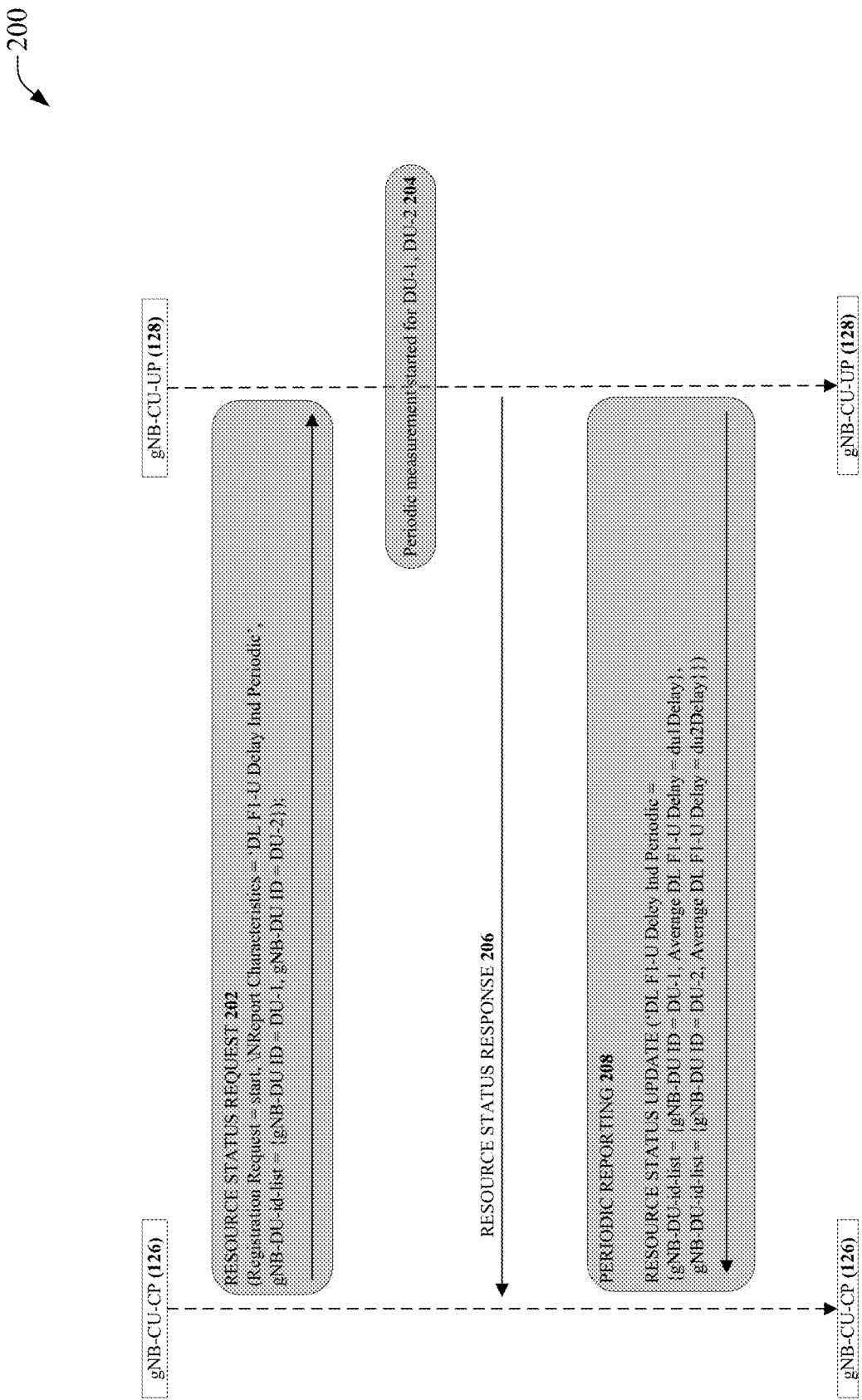
FIG. 2 is a diagram of an exemplary signaling flow in accordance with one or more embodiments described herein.

Turning now to FIG. 2, there is illustrated a diagram of an exemplary signaling flow 200 in accordance with one or more embodiments described herein. According to an embodiment, at 202, a resource status request can be transmitted (e.g., via the communication component 112) from the CU-CP 126 to a CU-UP (e.g., CU-UP 128 or another CU-UP herein). In this regard, the CU-CP 126 can request to start the periodic downlink (DL) F1-U delay measurement for the gNB-DU (e.g., DU 120) by using the E1AP: RESOURCE STATUS REQUEST/RESPONSE procedure. At 204, periodic measurement (e.g., of delay) can be started (e.g., via the measurement component 114) for a DU herein (e.g., DU 120). In this regard, the CU-CP 126 can initiate DL F1-U delay measurement of a list of gNB-DU's. The CU-UP (e.g., CU-UP 128 or another CU-UP herein) can periodically provide the DL F1-U delay measurement to CU-CP. This measurement can be maintained per PLMN, per QoS level, and per S-NSSAI. The CU-UP can additionally maintain the "Average delay DL on F1-U" measurement at per gNB-DU level. At 206, a resource status response can be transmitted (e.g., via the communication component 112) from the CU-UP (e.g., CU-UP 128) to the CU-CP 126. At 208, periodic reporting (e.g., via the communication component 112) can be performed (e.g., from the CU-UP to the CU-CP 126) In this regard, the CU-UP can periodically report the DL F1-U delay per gNB-DU to CU-UP by using the E1AP: RESOURCE STATUS UPDATE procedure. FIG. 3 illustrates an exemplary an E1AP resource status request message 300 in accordance with one or more embodiments described herein. In FIG. 3, additions or modifications to the E1AP resource status request message (e.g., that can be transmitted via the communication component 112) are emphasized in both highlight and bold. In this regard, the E1AP resource status request message 300 can comprise (1) "Report Characteristic" IE which is updated to support "DL F1-U measurement" to support starting of periodic reporting of the Average DL F1-U delay per gNB-DU; and (2) gNB-DU-id-list which is a new IE added to provide the list of gNB-DU-id for which periodic reporting of the Average DL F1-U delay is requested. FIG. 4 illustrates an exemplary an E1AP resource status update message 400 in accordance with one or more embodiments described herein. In FIG. 4, additions or modifications to the E1AP resource status update message (e.g., that can be transmitted via the communication component 112) are emphasized in both highlight and bold. In this regard, the E1AP resource status update message can comprise a DL F1-U Delay Ind Periodic, which is a new IE added provide the Average DL F1-U delay per gNB-DU.

Figure 5:
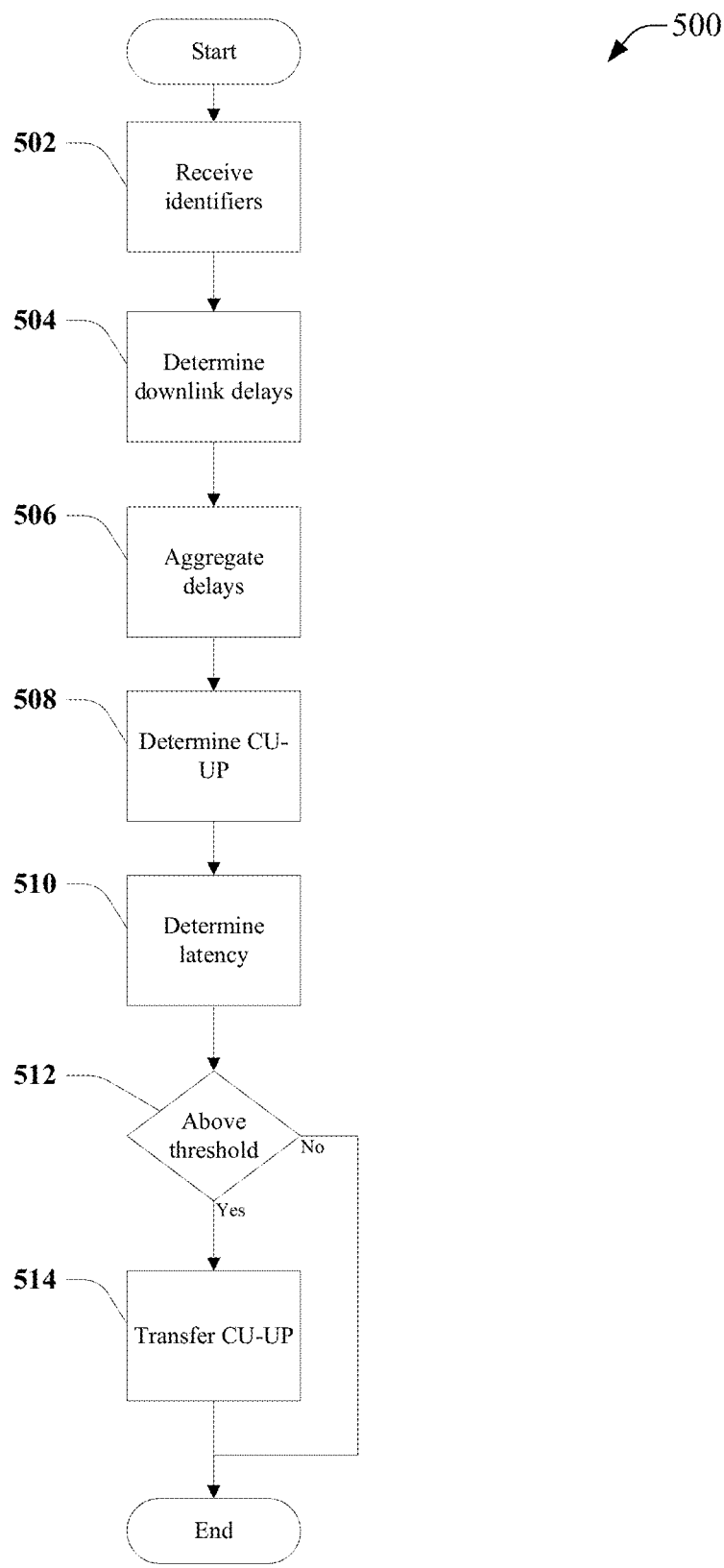
FIG. 5 is a flowchart for a process associated with selection of network equipment based on delay for delay critical services in accordance with one or more embodiments described herein.

Turning now to FIG. 5, there is illustrated a flowchart of a process 500 relating to overload status data transmission in accordance with one or more embodiments described herein. At 502, the process 500 can comprise receiving (e.g., via the communication component 112), from the centralized unit control plane (e.g., CU-CP 126), respective identifiers applicable to respective distributed units (e.g., DU 120). At 504, the process 500 can comprise determining (e.g., via the delay determination component 110), for the respective distributed units, respective average downlink delays on an F1-U interface applicable to respective centralized unit user planes (e.g., one or more of CU-UP 128, CU-UP 130, CU-UP 132, and/or CU-UP 132) of a group of centralized unit user planes of the network equipment (e.g., gNB 136). In this regard, the determining (e.g., via the delay determination component 110) of the respective average downlink delays comprises determining the respective average downlink delays per identifier of the respective identifiers. At 506, the process 500 can comprise aggregating respective average downlink delays on F1-U samples for any user equipment (e.g., UE 118) associated with the distributed unit (e.g., in order to determine a respective average downlink delay for a distributed unit of the group of distributed units). At 508, the process 500 can comprise determining a centralized unit user plane (e.g., one or more of CU-UP 128, CU-UP 130, CU-UP 132, and/or CU-UP 132) of the group of centralized unit user planes to communicatively couple to a user equipment (e.g., UE 118) for delay critical services (e.g., by utilizing the respective average downlink delays on the F1-U interface). At 510, the process 500 can comprise determining a latency requirement applicable to the user equipment. At 512, if a first centralized unit user plane of the group of centralized unit user planes is determined to fail to satisfy a defined delay threshold applicable to the latency requirement (Yes at 512), the process can proceed to 514. Otherwise (No at 512), the process 500 can end and/or repeat. At 514, the process 500 can comprise transferring (e.g., via the communication component 112) the user equipment (e.g., UE 118) from the first centralized unit user plane to a second centralized unit user plane of the group of centralized unit user planes determined to satisfy the defined delay threshold.

Figure 6:
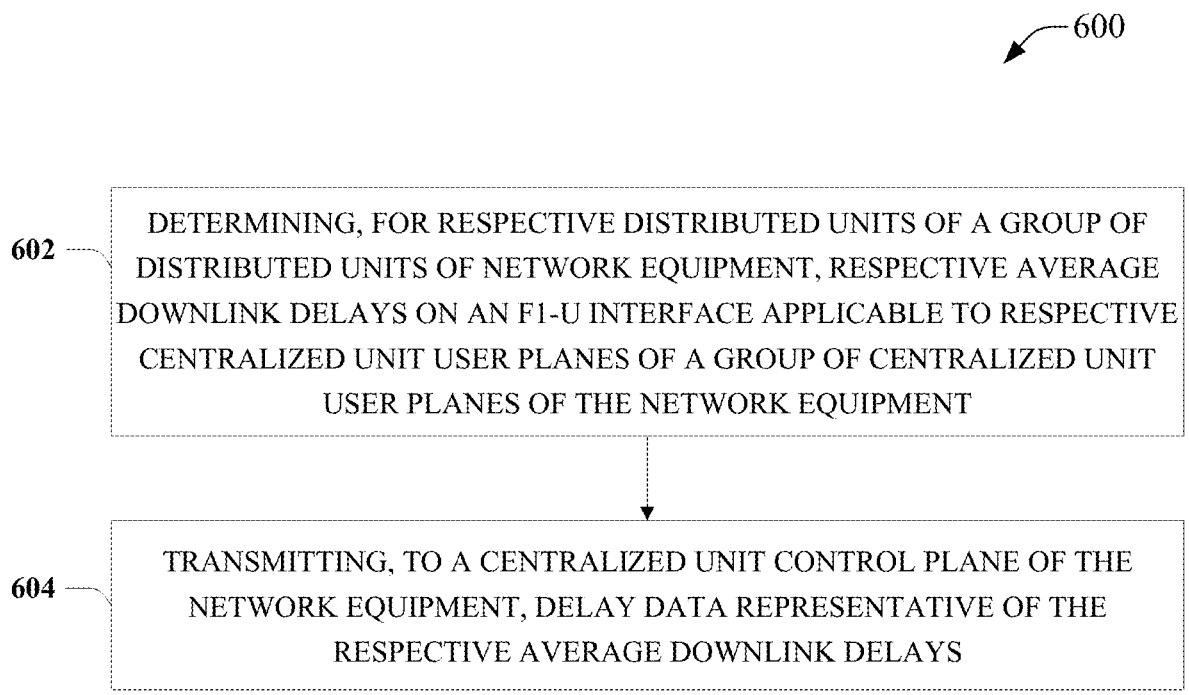
FIG. 6 is a block flow diagram for a process associated with selection of network equipment based on delay for delay critical services in accordance with one or more embodiments described herein.

FIG. 6 illustrates a block flow diagram for a process 600 associated with selection of network equipment based on delay for delay critical services in accordance with one or more embodiments described herein. At 602, the process 600 can comprise determining (e.g., via the delay determination component 110), for respective distributed units (e.g., DU 120) of a group of distributed units of network equipment, respective average downlink delays on an F1-U interface applicable to respective centralized unit user planes (e.g., one or more of CU-UP 128, CU-UP 130, CU-UP 132, and/or CU-UP 132) of a group of centralized unit user planes of the network equipment (e.g., gNB 136). At 604, the process 600 can comprise transmitting (e.g., via the communication component 112), to a centralized unit control plane (e.g., CU-CP 126) of the network equipment, delay data representative of the respective average downlink delays.

Figure 7:
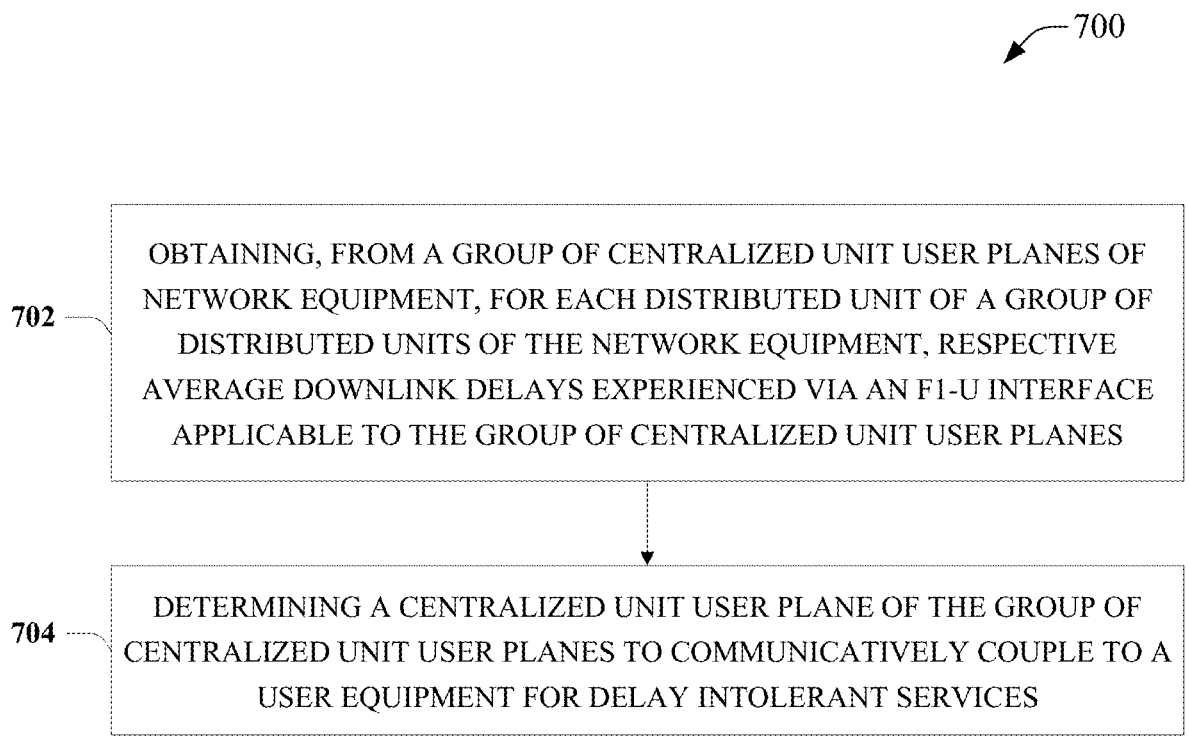
FIG. 7 is a block flow diagram for a process associated with selection of network equipment based on delay for delay critical services in accordance with one or more embodiments described herein.

FIG. 7 illustrates a block flow diagram for a process 700 associated with selection of network equipment based on delay for delay critical services in accordance with one or more embodiments described herein. At 702, the process 700 can comprise obtaining (e.g., via the delay determination component 110), from a group of centralized unit user planes (e.g., one or more of CU-UP 128, CU-UP 130, CU-UP 132, and/or CU-UP 132) of network equipment (e.g., gNB 136), for each distributed unit (e.g., DU 120) of a group of distributed units of the network equipment, respective average downlink delays experienced via an F1-U interface applicable to the group of centralized unit user planes (e.g., one or more of CU-UP 128, CU-UP 130, CU-UP 132, and/or CU-UP 132). At 704, the process 700 can comprise determining (e.g., via the communication component 112) a centralized unit user plane of the group of centralized unit user planes to communicatively couple to a user equipment (e.g., UE 118) for delay intolerant services.

Figure 8:
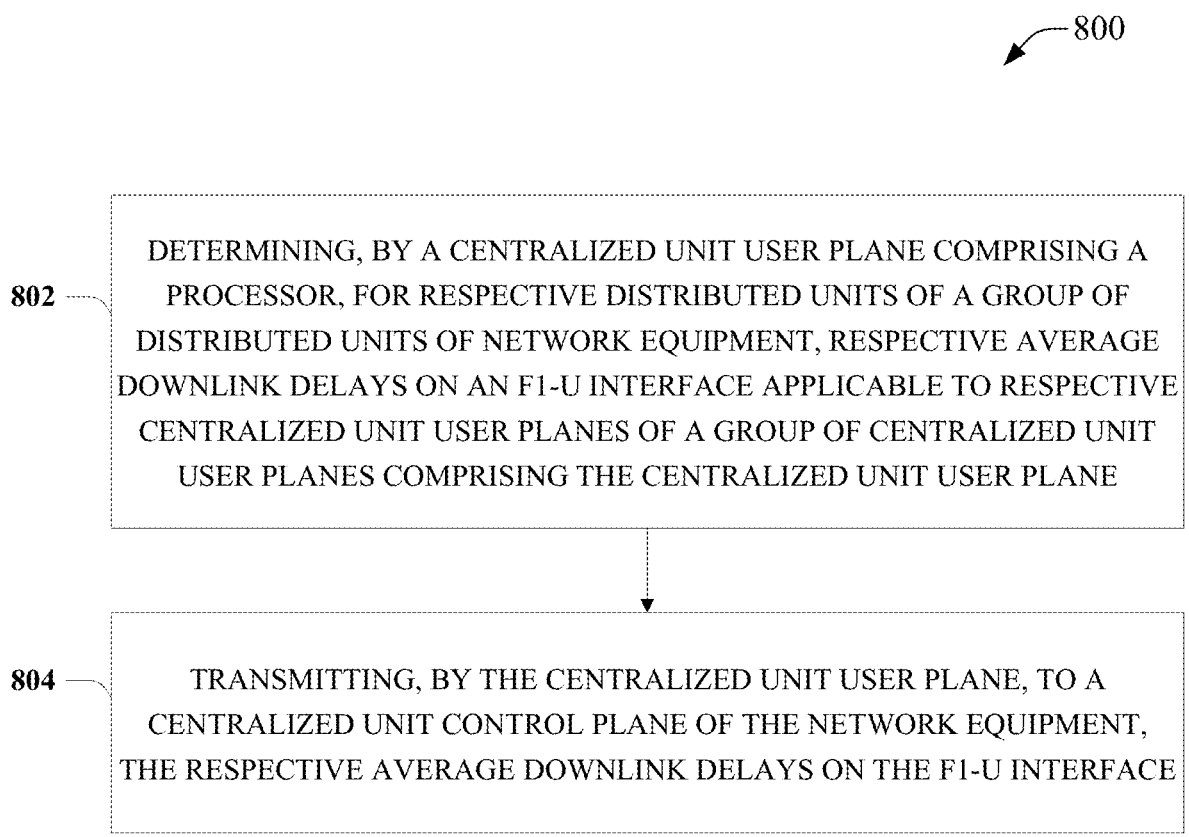
FIG. 8 is a block flow diagram for a process associated with selection of network equipment based on delay for delay critical services in accordance with one or more embodiments described herein.

FIG. 8 illustrates a block flow diagram for a process 800 associated with selection of network equipment based on delay for delay critical services in accordance with one or more embodiments described herein. At 802, the process 800 can comprise determining, by a centralized unit user plane (e.g., one or more of CU-UP 128, CU-UP 130. CU-UP 132, and/or CU-UP 132) comprising a processor (e.g., via the delay determination component 110), for respective distributed units (e.g., DU 120) of a group of distributed units of network equipment (e.g., gNB 136), respective average downlink delays on an F1-U interface applicable to respective centralized unit user planes (e.g., one or more of CU-UP 128, CU-UP 130, CU-UP 132, and/or CU-UP 132) of a group of centralized unit user planes comprising the centralized unit user plane. At 804, the process 800 can comprise transmitting, by the centralized unit user plane, to a centralized unit control plane (e.g., CU-UP 126) of the network equipment, the respective average downlink delays on the F1-U interface.

Figure 9:
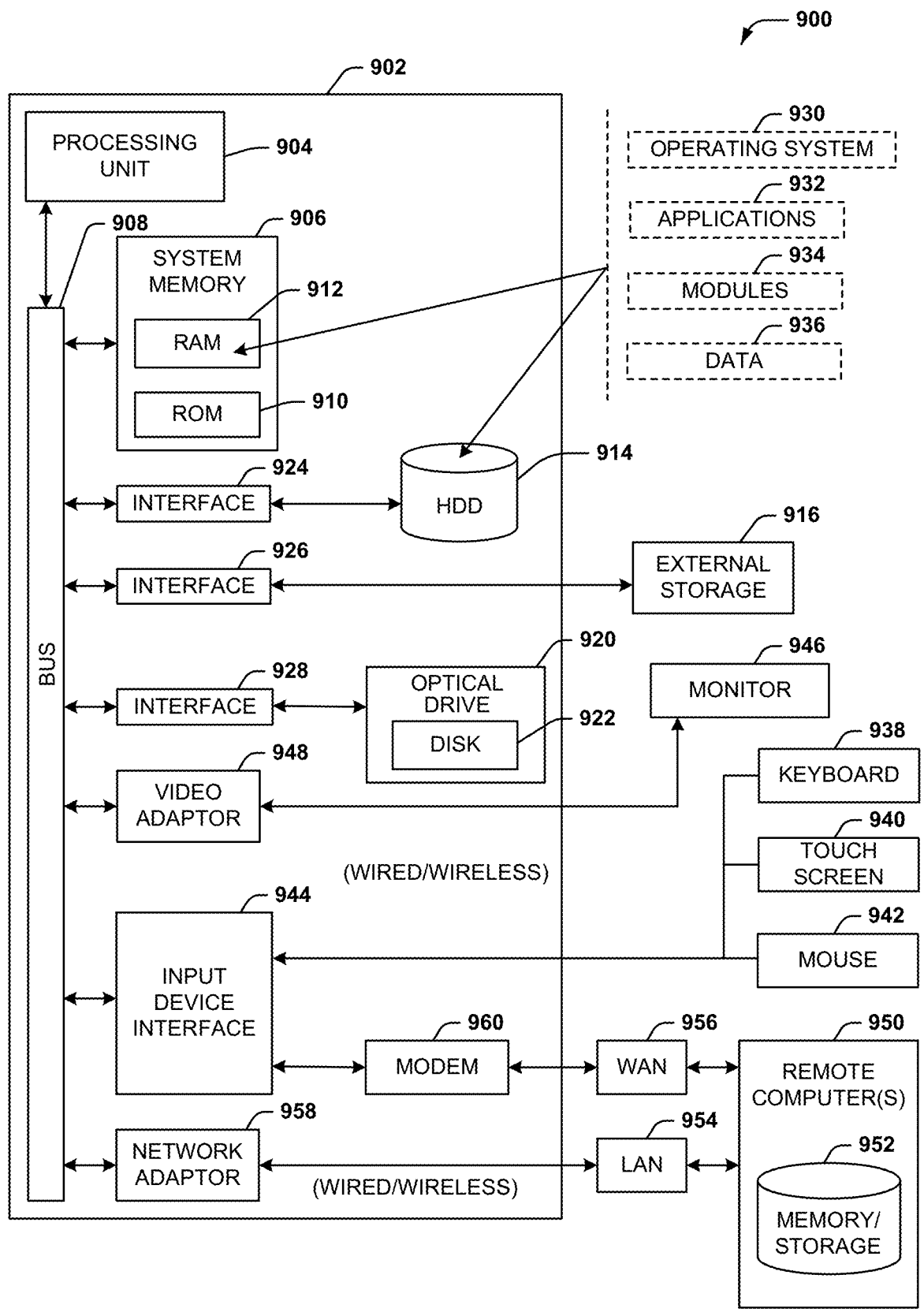
FIG. 9 is an example, non-limiting computing environment in which one or more embodiments described herein can be implemented.

In order to provide additional context for various embodiments described herein, FIG. 9 and the following discussion are intended to provide a brief, general description of a suitable computing environment 900 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared, and other wireless media.

With reference again to FIG. 9, the example environment 900 for implementing various embodiments of the aspects described herein includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes ROM 910 and RAM 912. A basic input/output system (BIOS) can be stored in a non-volatile memory such as ROM, erasable programmable read only memory (EPROM), EEPROM, which BIOS contains the basic routines that help to transfer information between elements within the computer 902, such as during startup. The RAM 912 can also include a high-speed RAM such as static RAM for caching data.

The computer 902 further includes an internal hard disk drive (HDD) 914 (e.g., EIDE, SATA), one or more external storage devices 916 (e.g., a magnetic floppy disk drive (FDD) 916, a memory stick or flash drive reader, a memory card reader, etc.) and an optical disk drive 920 (e.g., which can read or write from a disk 922, such as a CD-ROM disc, a DVD, a BD, etc.). While the internal HDD 914 is illustrated as located within the computer 902, the internal HDD 914 can also be configured for external use in a suitable chassis (not shown). Additionally, while not shown in environment 900, a solid-state drive (SSD) could be used in addition to, or in place of, an HDD 914. The HDD 914, external storage device(s) 916 and optical disk drive 920 can be connected to the system bus 908 by an HDD interface 924, an external storage interface 926 and an optical drive interface 928, respectively. The interface 924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 912, including an operating system 930, one or more application programs 932, other program modules 934 and program data 936. All or portions of the operating system, applications, modules, and/or data can also be cached in the RAM 912. The systems and methods described herein can be implemented utilizing various commercially available operating systems or combinations of operating systems.

Computer 902 can optionally comprise emulation technologies. For example, a hypervisor (not shown) or other intermediary can emulate a hardware environment for operating system 930, and the emulated hardware can optionally be different from the hardware illustrated in FIG. 9. In such an embodiment, operating system 930 can comprise one virtual machine (VM) of multiple VMs hosted at computer 902. Furthermore, operating system 930 can provide runtime environments, such as the Java runtime environment or the .NET framework, for applications 932. Runtime environments are consistent execution environments that allow applications 932 to run on any operating system that includes the runtime environment. Similarly, operating system 930 can support containers, and applications 932 can be in the form of containers, which are lightweight, standalone, executable packages of software that include, e.g., code, runtime, system tools, system libraries and settings for an application.

Further, computer 902 can be enable with a security module, such as a trusted processing module (TPM). For instance, with a TPM, boot components hash next in time boot components, and wait for a match of results to secured values, before loading a next boot component. This process can take place at any layer in the code execution stack of computer 902, e.g., applied at the application execution level or at the operating system (OS) kernel level, thereby enabling security at any level of code execution.

A user can enter commands and information into the computer 902 through one or more wired/wireless input devices, e.g., a keyboard 938, a touch screen 940, and a pointing device, such as a mouse 942. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 904 through an input device interface 944 that can be coupled to the system bus 908, but can be connected by other interfaces, such as a parallel port, an IEEE 1394 serial port, a game port, a USB port, an IR interface, a BLUETOOTH® interface, etc.

A monitor 946 or other type of display device can be also connected to the system bus 908 via an interface, such as a video adapter 948. In addition to the monitor 946, a computer typically includes other peripheral output devices (not shown), such as speakers, printers, etc.

The computer 902 can operate in a networked environment using logical connections via wired and/or wireless communications to one or more remote computers, such as a remote computer(s) 950. The remote computer(s) 950 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 952 is illustrated. The logical connections depicted include wired/wireless connectivity to a local area network (LAN) 954 and/or larger networks, e.g., a wide area network (WAN) 956. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 can be connected to the local network 954 through a wired and/or wireless communication network interface or adapter 958. The adapter 958 can facilitate wired or wireless communication to the LAN 954, which can also include a wireless access point (AP) disposed thereon for communicating with the adapter 958 in a wireless mode.

When used in a WAN networking environment, the computer 902 can include a modem 960 or can be connected to a communications server on the WAN 956 via other means for establishing communications over the WAN 956, such as by way of the Internet. The modem 960, which can be internal or external and a wired or wireless device, can be connected to the system bus 908 via the input device interface 944. In a networked environment, program modules depicted relative to the computer 902 or portions thereof, can be stored in the remote memory/storage device 952. It will be appreciated that the network connections shown are example and other means of establishing a communications link between the computers can be used.

When used in either a LAN or WAN networking environment, the computer 902 can access cloud storage systems or other network-based storage systems in addition to, or in place of, external storage devices 916 as described above. Generally, a connection between the computer 902 and a cloud storage system can be established over a LAN 954 or WAN 956 e.g., by the adapter 958 or modem 960, respectively. Upon connecting the computer 902 to an associated cloud storage system, the external storage interface 926 can, with the aid of the adapter 958 and/or modem 960, manage storage provided by the cloud storage system as it would other types of external storage. For instance, the external storage interface 926 can be configured to provide access to cloud storage sources as if those sources were physically connected to the computer 902.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 10:
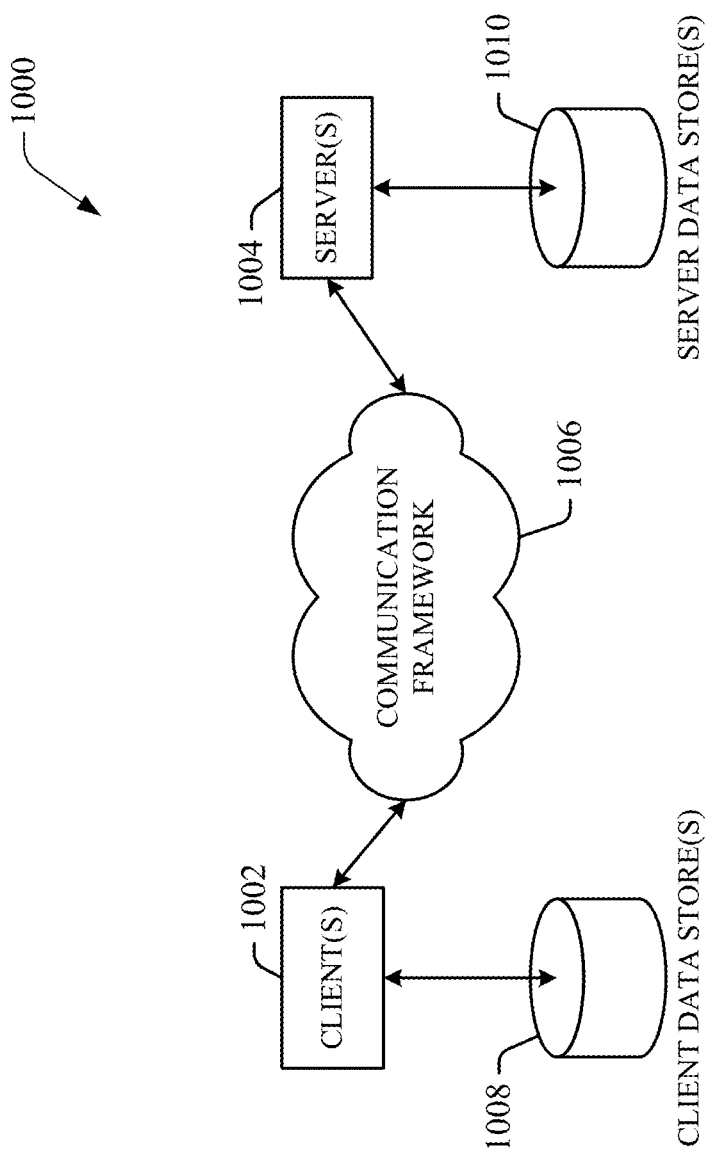
FIG. 10 is an example, non-limiting networking environment in which one or more embodiments described herein can be implemented.

Referring now to FIG. 10, there is illustrated a schematic block diagram of a computing environment 1000 in accordance with this specification. The system 1000 includes one or more client(s) 1002. (e.g., computers, smart phones, tablets, cameras, PDA's). The client(s) 1002 can be hardware and/or software (e.g., threads, processes, computing devices). The client(s) 1002 can house cookie(s) and/or associated contextual information by employing the specification, for example.

The system 1000 also includes one or more server(s) 1004. The server(s) 1004 can also be hardware or hardware in combination with software (e.g., threads, processes, computing devices). The servers 1004 can house threads to perform transformations of media items by employing aspects of this disclosure, for example. One possible communication between a client 1002 and a server 1004 can be in the form of a data packet adapted to be transmitted between two or more computer processes wherein data packets may include coded analyzed headspaces and/or input. The data packet can include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

In one exemplary implementation, a client 1002 can transfer an encoded file, (e.g., encoded media item), to server 1004. Server 1004 can store the file, decode the file, or transmit the file to another client 1002. It is noted that a client 1002 can also transfer uncompressed file to a server 1004 and server 1004 can compress the file and/or transform the file in accordance with this disclosure. Likewise, server 1004 can encode information and transmit the information via communication framework 1006 to one or more clients 1002.

The illustrated aspects of the disclosure may also be practiced in distributed computing environments where certain tasks are performed by remote processing devices that are linked through a communications network. In a distributed computing environment, program modules can be located in both local and remote memory storage devices.

The above description includes non-limiting examples of the various embodiments. It is, of course, not possible to describe every conceivable combination of components or methods for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
    a processor; and
    a memory that stores executable instructions that, when executed by the processor, facilitate performance of operations, comprising:
    determining, for respective distributed units of a group of distributed units of network equipment, respective average downlink delays on an F1-U interface applicable to respective centralized unit user planes of a group of centralized unit user planes of the network equipment; and
    transmitting, to a centralized unit control plane of the network equipment, delay data representative of the respective average downlink delays.

2. The system of claim 1, wherein the operations further comprise:
    receiving, from the centralized unit control plane, respective identifiers applicable to the respective distributed units, wherein the determining of the respective average downlink delays comprises determining the respective average downlink delays per identifier of the respective identifiers.

3. The system of claim 1, wherein the transmitting of the delay data representative of the respective average downlink comprises transmitting according to a defined user equipment specific message applicable to the group of centralized unit user planes.

4. The system of claim 1, wherein a respective average downlink delay for a distributed unit of the group of distributed units is determined by aggregating respective average downlink delays on F1-U samples for any user equipment associated with the distributed unit.

5. The system of claim 1, wherein the centralized unit control plane utilizes the respective average downlink delays on the F1-U interface to select a centralized unit user plane of the group of centralized unit user planes to communicatively couple to a user equipment for delay critical services.

6. The system of claim 1, wherein the determining of the respective average downlink delays comprises determining the respective average downlink delays per public land mobile network applicable to the group of centralized unit user planes.

7. The system of claim 1, wherein the determining of the respective average downlink delays comprises determining the respective average downlink delays per quality of service level applicable to the group of centralized unit user planes.

8. The system of claim 1, wherein the determining of the respective average downlink delays comprises determining the respective average downlink delays per single network slice selection assistance information applicable to the group of centralized unit user planes.

9. A non-transitory machine-readable medium, comprising executable instructions that, when executed by a processor, facilitate performance of operations, comprising:
    obtaining, from a group of centralized unit user planes of network equipment, for each distributed unit of a group of distributed units of the network equipment, respective average downlink delays experienced via an F1-U interface applicable to the group of centralized unit user planes; and
    determining a centralized unit user plane of the group of centralized unit user planes to communicatively couple to a user equipment for delay intolerant services.

10. The non-transitory machine-readable medium of claim 9, wherein the respective average downlink delays are periodically reported by the group of centralized unit user planes using a defined E1 application protocol status procedure.

11. The non-transitory machine-readable medium of claim 9, wherein the operations further comprise:
    initiating measurements of the respective average downlink delays experienced via the F1-U interface applicable to the group of centralized unit user planes.

12. The non-transitory machine-readable medium of claim 9, wherein the operations further comprise:
    determining a latency requirement applicable to the user equipment; and
    in response to a determination that a first centralized unit user plane of the group of centralized unit user planes fails to satisfy a defined delay threshold applicable to the latency requirement, transferring the user equipment from the first centralized unit user plane to a second centralized unit user plane of the group of centralized unit user planes determined to satisfy the defined delay threshold.

13. The non-transitory machine-readable medium of claim 9, wherein a respective average downlink delay for a distributed unit of the group of distributed units is determined by aggregating respective average downlink delays experienced via F1-U samples for all user equipment associated with the distributed unit.

14. The non-transitory machine-readable medium of claim 9, wherein the respective average downlink delays are determined per public land mobile network applicable to the group of centralized unit user planes.

15. The non-transitory machine-readable medium of claim 9, wherein the respective average downlink delays are determined per quality of service level applicable to the group of centralized unit user planes.

16. The non-transitory machine-readable medium of claim 9, wherein the respective average downlink delays are determined per single network slice selection assistance information applicable to the group of centralized unit user planes.

17. A method, comprising:
 determining, by a centralized unit user plane comprising a processor, for respective distributed units of a group of distributed units of network equipment, respective average downlink delays on an F1-U interface applicable to respective centralized unit user planes of a group of centralized unit user planes comprising the centralized unit user plane; and
 transmitting, by the centralized unit user plane, to a centralized unit control plane of the network equipment, the respective average downlink delays on the F1-U interface.

18. The method of claim 17, further comprising:
 receiving, by the centralized unit user plane from the centralized unit control plane, respective identifiers applicable to the group of distributed units of the network equipment, wherein the respective average downlink delays on the F1-U interface applicable to the group of centralized unit user planes are determined per identifier of the respective identifiers.

19. The method of claim 17, wherein the respective average downlink delays on the F1-U interface are transmitted to the centralized unit control plane according to a defined user equipment specific message applicable to the centralized unit user plane.

20. The method of claim 17, wherein the centralized unit control plane utilizes the respective average downlink delays on the F1-U interface to select the centralized unit user plane of the group of centralized unit user planes to communicatively couple to a user equipment for services identified as delay critical.

\* \* \* \* \*